United States Patent [19]
Bremm

[11] 3,853,290
[45] Dec. 10, 1974

[54] DRIVE GEARING FOR FOLDING AIRCRAFT WINGS

[75] Inventor: Friedrich Bremm, Munich, Germany

[73] Assignee: Messerschmitt-Bolkow-Blohm GmbH, Munich, Germany

[22] Filed: Mar. 6, 1973

[21] Appl. No.: 338,585

[30] Foreign Application Priority Data
Mar. 16, 1972 Germany.............................. 2212648

[52] U.S. Cl. .................................................. 244/46
[51] Int. Cl. .............................................. B64c 3/38
[58] Field of Search .............................. 244/46–49; 74/417

[56] References Cited
UNITED STATES PATENTS

| | | | |
|---|---|---|---|
| 1,958,121 | 5/1934 | Winquist............................. | 74/417 |
| 2,715,843 | 7/1955 | Clarke................................. | 74/417 |
| 3,469,806 | 9/1969 | Olchawa............................. | 244/46 |
| 3,503,274 | 3/1970 | Howard............................... | 74/417 |
| 3,667,310 | 6/1972 | Hahner................................ | 74/417 |

Primary Examiner—Trygve M. Blix
Assistant Examiner—Sherman D. Basinger
Attorney, Agent, or Firm—Woodhams, Blanchard and Flynn

[57] ABSTRACT

Drive gearing means for operating the wings of folding winged aircraft. In folding wing aircraft whose wings react for the amount of sweepback thereof to the position of a lever, there is provided a double gear having oppositely facing, annularly arranged, teeth aligned in a generally radial direction and each ring thereof being connected through a suitable pinion to a source of rotary power. Shafts connect from each of the gear halves through a universal joint to a threaded shaft. Said threaded shafts then each act through the cooperating threading of a rod for converting rotary motion of said shafts to lineal motion of said rods. The rods are then connected for operating said lever of each wing.

4 Claims, 1 Drawing Figure

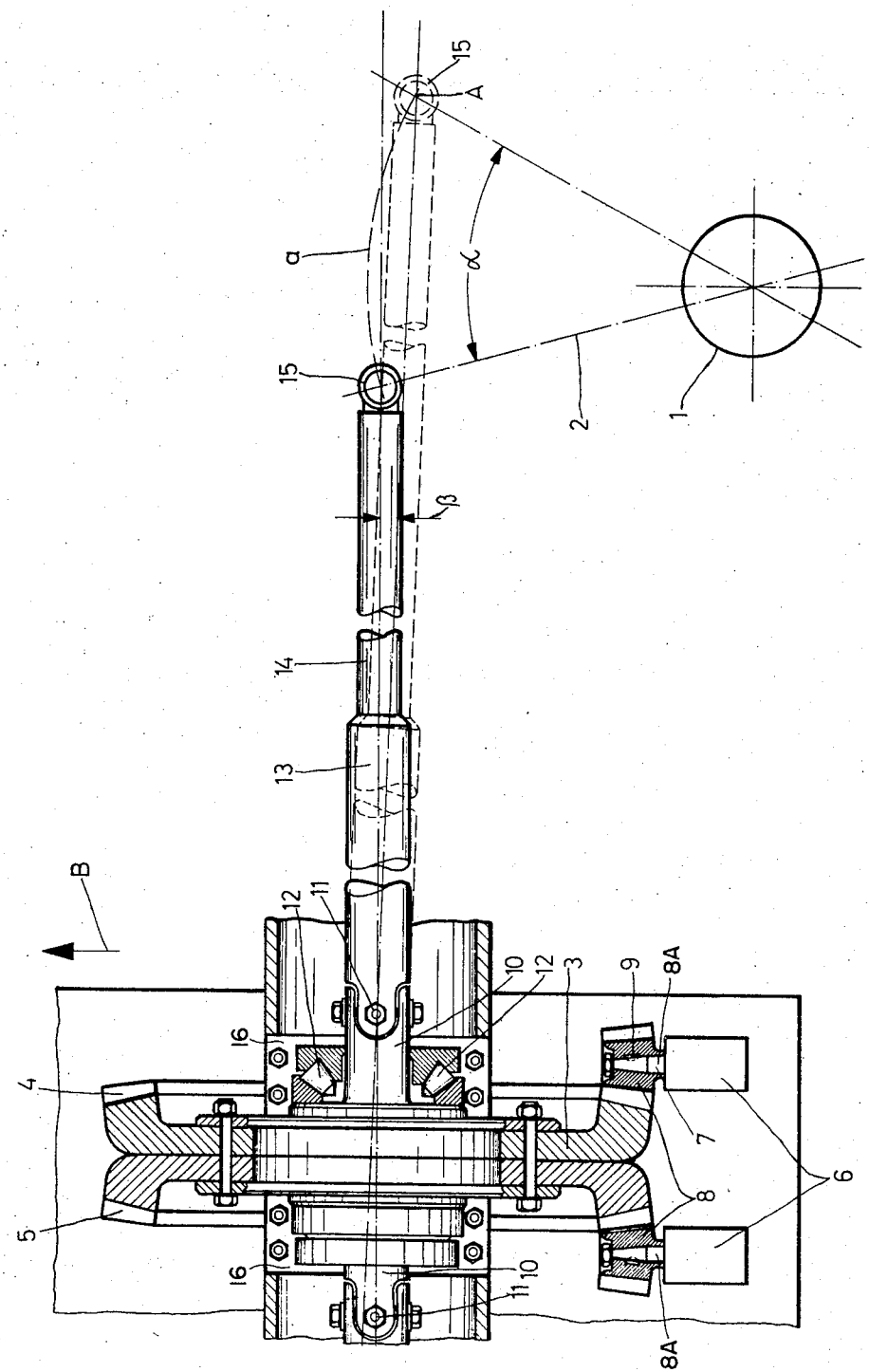

3,853,290

DRIVE GEARING FOR FOLDING AIRCRAFT WINGS

BACKGROUND OF THE INVENTION

This invention relates to drive means for the folding wings of an aircraft having lever operated variable sweepback means. A motor driven, centrally arranged double gear comprising a pair of back-to-back bevel gear components, transmit rotary movement through a pair of jointed couplings arranged, respectively, on opposite sides of the gears to a pair of oppositely extending shafts whose rotary movement is then used to operate the levers.

In one known drive of this type, a gear is provided with radial teeth and is driven by two hydraulic motors arranged adjacent the periphery of a central gear. The shafts of the hydraulic motors are in this arrangement provided with pinions which drive a translation gear system which consists of a gear and a further pinion.

To drive the central gear through such radially extending teeth has the disadvantage that the forces which are directed perpendicularly to the axis of the central gear may stress the central gear bearing sufficiently to create danger of an overload on the bearing. Since for each gear two bearings are required, there is further an extra expense in the construction of the gear system, and also a noticeable disadvantage during overhauling or in the case of damage of the drive motors or the gear system.

SUMMARY OF THE INVENTION

According to the invention these disadvantages are avoided by constructing the motor driven gear as a double-sided, back-to-back bevel gear at the one edge of which two motors are arranged which are effectively connected through suitable pinions to annular teeth on the periphery of the bevel gear. The two motors are advantageously so dimensioned that the output of one motor is sufficient for the operation of the levers through their entire scope of travel and the second motor is redundant and provided only for purposes of increased safety. The suggested construction offers the further advantage that the main drive gear in its form as a double bevel gear is completely unstressed in the axial direction.

Since for reasons of safety the power transmission from the motors to the bevel gear must occur equally smoothly in both directions and in order to always engage several teeth simultaneously, the invention provides that the bevel gears and the rims are preferably provided with hypoid teeth.

The forces which occur during the operation of the folding wing mechanism, which forces are transmitted onto the drive shaft by the pivotal levers, are not always imposed onto the bevel gear vertically to its plane but instead may be applied angularly thereto. According to a further feature of the invention, a shaft is mounted at one end on the bevel gear and connects to a jointed coupling. It is supported by suitable thrust and radial bearings for receiving of forces which act angularly to the bevel gear. In order to avoid, in the event of a seizing of the shaft bearings or other gear parts, a destruction of essential parts of the drive, a further feature of the invention suggests arranging a shear key between the drive shafts of the motors and the bevel gears.

BRIEF DESCRIPTION OF THE DRAWING

The invention is illustrated in the accompanying drawing: FIGURE 1 is a cross sectional view of the bevel gear and the pivot connection and a schematic illustration of the folding wing operation, wherein only one side of a symmetrical arrangement is illustrated.

DETAILED DESCRIPTION

The direction of flight is indicated by the arrow B in the illustration. The right pivot bearing 1 is operated by a lever 2 which is pivotal through the angle $\alpha$ indicated by dash-dotted lines.

The pivot bearing is operated by means of the double bevel gear 3, comprising back-to-back arranged bevel gear components, which is arranged in the axis of symmetry of the aircraft and which has two rims 4 and 5 on its periphery. The double bevel gear 3 is supported in the center of the aircraft on a bearing block 16 with the center line of the double bevel gear coinciding with the longitudinal axis of the aircraft. The double bevel gear is driven by two motors 6, advantageously hydraulic, through the output shafts 8A and two pinions 8 which are operatively associated with said motors. Between each of the drive shafts 7 of the motors 6 and the bevel pinions 8 there is respectively arranged a shear key 9 which can shear upon a seizing of gear parts. The axis of rotation of the double bevel gear 3 is positioned parallel to the transverse axis of the aircraft. Shaft ends 10 are mounted on both sides on the double bevel gear 3, which shaft ends lead to jointed couplings, for example, universal joints 11. The shaft ends 10 are supported by the combined thrust and radial bearings 12 whereby also to absorb forces which act at an angle onto the double bevel gear. The motor 6 and pinions 8 also serve to absorb axial thrust forces on the bevel gears 3.

The universal joints 10 transmit the rotary movement of the double bevel gear to the drive shaft 13. The drive shaft 13 is hollow and has an internal thread, which is advantageously manufactured of polytetrafluora ethylene, and which is engaged by the external thread of a push rod 14. A link piece 15 is mounted on the outer end of the push rod 14, which link piece is hingedly connected to the lever 2 for operating the folding wings. To permit a fine adjustment of the link piece 15, same has a shaft which is provided with a fine thread.

The operation of the folding wing drive is explained hereinafter with reference to the drawing in which the position of the drive shaft 13 and the push rod 14 is illustrated in full lines in the initial position of the folding wing.

When the wings are to carry out a swinging movement, the motors 6 are energized through a (not illustrated) control mechanism and rotate the double bevel gear 3 through the pinions 8. This rotary movement is transmitted to the drive shaft 13, whereby the rotation of said shaft is converted into a linear movement of the push rod 14 by the action of its internal thread with the external thread of the push rod 14. The push rod 14 which is connected to the link piece 15 applies the desired swinging movement to the lever 2. During pivoting of the lever 2 about the axis of the pivot bearing 1, the axis of the link piece 15 describes the arcuate segment "$a$." After a full stroke of the lever 2, the link piece 15 assumes the position indicated at A, namely, the drive shaft 13 and the push rod 14 are deflected through the small angle β, which deflection is made possible by the universal joint 11. The deflected position of the drive shaft and the push rod is illustrated in dashed lines in the FIGURE. The universal joint 11 further permits a pivotal motion of the drive shaft and the push rod in a vertical direction (namely, perpendicular to the drawing plane) which is necessary during the pivotal operation of the wing.

The mentioned angular movements of the drive shaft 13 cause forces which act in an inclined manner onto the plane of the double bevel gear 3. The axial thrust aspect of the roller bearings 12 and motor 6 and pinions 8 are provided to absorb these forces.

Throughout the foregoing specification there has for convenience in description been illustrated and described only gear and pinion components comprising a beveled gear and a correspondingly beveled pinion. It will be recognized that a variety of other gearing arrangements may be provided, such as spur pinions or worms cooperating with face gears. Further, although hypoid gears are indicated as preferable, other types of teeth including spur or helical are also possible.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A drive arrangement for moving the folding wings of an aircraft having a variable sweepback characteristic, said folding wings being movable through pivoted lever means, said drive arrangement including motor driven gear means for transmitting its rotary sides through two jointed couplings which are arranged on both sides thereof onto two shafts means, the rotary movement of which is used for operating said pivoted lever means, comprising the improvement wherein said motor driven gear means comprises a pair of back-to-back bevel gears and a pair of fixedly mounted motors each having a rotatable output shaft parallel to the other and a single bevel pinion mounted on each output shaft of said motors fixedly engaging the teeth of the respective one of said bevel gears, said bevel pinions and the axes of rotation of said output shafts on said motors being positioned on opposite axial sides of said back-to-back bevel gears, said axes of rotation of said output shafts extending in a plane generally parallel to the axis of rotation of said back-to-back bevel gears, said motors and pinions being adapted to support at least a portion of the axial thrust applied to said back-to-back bevel gears.

2. A drive arrangement according to claim 1, wherein said pair of bevel gears are provided with hypoid teeth.

3. A drive arrangement according to claim 1, including a shear key positioned between each of said output shafts of said motors and said bevel pinions.

4. A drive arrangement for moving the folding wings of an aircraft having a variable sweepback characteristic, said folding wings being movable through pivoted lever means, said drive arrangement including motor driven gear means for transmitting its rotary movement through two jointed couplings which are arranged on both sides thereof onto two shafts means, the rotary movement of which is used for operating said pivoted lever means, comprising the improvement wherein said motor driven gear means comprises a pair of back-to-back bevel gears, said shaft means being fixedly secured to said back-to-back bevel gears and extending axially therefrom on opposite sides thereof, thrust bearing means engaging said shaft means and rotatably supporting said back-to-back bevel gears, said jointed coupling means being located between said thrust bearing means and said pivoted lever means for connecting said shaft means to said pivoted lever means, a pair of fixedly mounted motors each having a rotatable output shaft parallel to the other and a single bevel pinion gear mounted on each output shaft continuously engaging the teeth of one of said pair of bevel gears, said bevel gears and axes of rotation of said output shafts on said motors being positioned on opposite axial sides of said back-to-back bevel gears, said axes of rotation of said output shafts extending in a plane generally parallel to the axis of rotation of said back-to-back bevel gears whereby an axial thrust applied to said shaft means is supported by said thrust bearing means and the connection between said motors and said back-to-back bevel gears.

* * * * *

UNITED STATES PATENT OFFICE
CERTIFICATE OF CORRECTION

Patent No. 3,853,290        Dated December 10, 1974

Inventor(s) Friedrich Bremm

It is certified that error appears in the above-identified patent and that said Letters Patent are hereby corrected as shown below:

Column 3, line 35; change "sides" to --movement--.

Signed and sealed this 8th day of April 1975.

(SEAL)
Attest:

RUTH C. MASON
Attesting Officer

C. MARSHALL DANN
Commissioner of Patents
and Trademarks